US008660232B2

(12) United States Patent
D'Offizi et al.

(10) Patent No.: US 8,660,232 B2
(45) Date of Patent: Feb. 25, 2014

(54) SUPERSAFE AND SIMPLY-/EASILY-DECOMMISSIONABLE NUCLEAR POWER PLANT

(75) Inventors: Sergio D'Offizi, Rome (IT); Susanna Antignano, Rome (IT)

(73) Assignee: Sergio D'Offizi, Rome (IT)

( * ) Notice: Subject to any disclaimer, the term of this patent is extended or adjusted under 35 U.S.C. 154(b) by 814 days.

(21) Appl. No.: 12/599,404

(22) PCT Filed: May 6, 2008

(86) PCT No.: PCT/IT2008/000306
§ 371 (c)(1),
(2), (4) Date: Nov. 9, 2009

(87) PCT Pub. No.: WO2008/136038
PCT Pub. Date: Nov. 13, 2008

(65) Prior Publication Data
US 2010/0303192 A1 Dec. 2, 2010

(30) Foreign Application Priority Data
May 7, 2007 (IT) .............................. RM2007A0256

(51) Int. Cl.
*G21C 13/02* (2006.01)
*G21C 13/00* (2006.01)

(52) U.S. Cl.
USPC ......... 376/273; 52/169.1; 52/169.6; 376/260; 376/272; 376/347; 376/463

(58) Field of Classification Search
USPC .............. 52/169.1, 169.6; 376/260, 272–276, 376/347, 277, 287, 293, 294, 327, 336, 337, 376/361, 383, 391, 394, 283, 463
See application file for complete search history.

(56) References Cited

U.S. PATENT DOCUMENTS

| | | | | |
|---|---|---|---|---|
| 3,219,537 A | * | 11/1965 | Janner et al. | 376/275 |
| 3,236,739 A | * | 2/1966 | Celle et al. | 376/273 |
| 3,262,857 A | * | 7/1966 | Schlicht et al. | 376/275 |
| 3,330,122 A | * | 7/1967 | Janner | 376/273 |
| 3,341,424 A | * | 9/1967 | Schlicht et al. | 376/275 |
| 3,755,076 A | * | 8/1973 | Lindsley | 376/273 |

(Continued)

FOREIGN PATENT DOCUMENTS

| | | | |
|---|---|---|---|
| EP | 0495103 A1 * | 7/1992 | ............... G21C 1/00 |
| FR | 2386105 A | 10/1978 | |
| WO | 2006057603 A | 6/2006 | |

OTHER PUBLICATIONS

Rogers, Franklyn, Underground nuclear power plants: environmental and economic aspects, Nuclear News, May 1971, pp. 36-39.

(Continued)

*Primary Examiner* — Bernarr Gregory
(74) *Attorney, Agent, or Firm* — Young & Thompson

(57) ABSTRACT

The invention relates to an inexpensively-/easily-decommissionable nuclear power plant, where a nuclear isle of one or more nuclear power-stations is installed in caverns, and further, side by side with them, a center for characterizing, treating and conditioning radioactive wastes and two repositories are installed in suitable caverns, with a final repository being adapted to store low-intermediate level nuclear wastes and a temporary repository being adapted to store spent fuel, high-level long-life radioactive materials and, in case, spare nuclear rods for reactor refueling.

14 Claims, 2 Drawing Sheets

(56) References Cited

U.S. PATENT DOCUMENTS

| | | | |
|---|---|---|---|
| 3,851,495 A * | 12/1974 | Lahoud et al. | 376/273 |
| 4,000,038 A | 12/1976 | Moser | |
| 4,025,387 A * | 5/1977 | Haferkamp et al. | 376/394 |
| 4,026,675 A * | 5/1977 | Marsch | 376/394 |
| 4,167,087 A * | 9/1979 | Schabert et al. | 52/169.6 |
| 4,244,153 A | 1/1981 | Schwarzer et al. | |
| 4,569,819 A * | 2/1986 | David | 376/273 |
| 4,661,311 A * | 4/1987 | Schoening et al. | 376/273 |
| 4,701,298 A * | 10/1987 | Schoening et al. | 376/273 |
| 4,789,519 A * | 12/1988 | Schoening et al. | 376/337 |
| 4,826,652 A * | 5/1989 | Schoening | 376/273 |
| 4,851,183 A * | 7/1989 | Hampel | 376/274 |
| 4,971,751 A * | 11/1990 | David | 376/273 |
| 4,971,752 A * | 11/1990 | Parker | 376/274 |
| 4,986,956 A * | 1/1991 | Garabedian | 376/283 |
| 5,013,519 A * | 5/1991 | Nakamura et al. | 376/273 |
| 5,223,208 A * | 6/1993 | Ishimaru | 376/273 |
| 5,229,067 A * | 7/1993 | Hammers | 376/294 |
| 5,746,540 A * | 5/1998 | Hindle et al. | 376/273 |
| 5,920,602 A * | 7/1999 | Botzem et al. | 376/272 |
| 6,185,269 B1 * | 2/2001 | Hui | 376/293 |
| 7,068,748 B2 * | 6/2006 | Singh | 376/272 |

OTHER PUBLICATIONS

International Search Report in Corresponding Italian Application PCT/IT2008/000306 dated Oct. 31, 2008.

\* cited by examiner

SUPERSAFE AND SIMPLY-/EASILY-DECOMMISSIONABLE NUCLEAR POWER PLANT

TECHNICAL FIELD

The present invention relates to a nuclear power plant having highest ranked safety features, which can be decommissioned with certainty, easily and in a very inexpensive way at the end of its service life.

More in detail, the invention concerns a plan of a nuclear power system, with its radioactive components and relevant facilities for the treatment and disposal of radioactive wastes that are located in a safe manner altogether underground, being covered by an adequate thickness of rocks. This plan permits an absolute environment and population protection together with a safe and easy decommissioning.

BACKGROUND ART

Conventional power plants for the production of electric energy from controlled-fission nuclear reactions are today designed and constructed in such a way that all the main works which said power plants are comprised of, in particular the nuclear isle, the stream generators, the turbine/electric generator isle and the safeguard buildings, are located above the soil surface.

Safety and security of these power plants that are considered as very dangerous targets, particularly after the Chernobyl power-plant disaster and the terrorist attacks to the Twin Towers of New York, are based on various systems. In particular, their safety is obtained by using redundant structural solutions (for both plant engineering and building works), separating circuits for heat exchange and cooling, constructing with pre-assembling piping, adopting high constructive standards, protecting and multiplying safeguard buildings and applying extremely rigorous procedures for the management of plants and personnel.

However it is evident that such solutions are absolutely inefficient to protect a nuclear power plant against the most probable attacks, i.e. a launch of large aircraft filled with fuel or explosive, or even of rockets, towards the nuclear isle or pools containing spent nuclear fuel. These are scenarios that have become very realistic in the last years.

It is evident that events of this kind would generate what military experts cell "dirty bombs", whose effects, even if not so destroying like those of a nuclear bomb, would be anyway so dangerous to pollute with following fall out large areas, up to thousands of square kilometers, with a result of making these areas inhabitable for centuries.

Several solutions have been proposed by skilled in the art from the 60's. Even if such solutions were not specifically designed to withstand extreme terrorist attacks that were not foreseeable in the past, they aimed to reach high safety levels against accidental releases of radioactive materials, by locating a nuclear reactor in underground caverns that were excavated for this purpose.

However, the proposed solutions do not allow sufficiently advantageous effects to be achieved so that their adoption can be suggested, on the one hand for the safety, on the other for the overall economic cost. A solution for an underground nuclear power plant is disclosed for example in the patent RU No. 2.273.901.

The solution proposed by the present invention fits in this context, which provides an embodiment of a nuclear power plant able to assure:

a strong reduction of the cost needed for decommissioning the nuclear power plant by applying innovative procedures, the decommissioning being certain at the end of its life service;

an absolute protection of population and environment outside the nuclear power plant from radioactive releases due to either accidental causes or any terrorist attacks or catastrophic natural events;

a final supersafe storage of low-intermediate level radioactive wastes that are produced during the operation of the nuclear power plant, by avoiding the handing in the soil surface of such radioactive wastes towards main treatment/conditioning/disposal centres;

an interim, insuperably safe storage of spent fuel, of high-level long-life radioactive materials and, if necessary, of spare rods for refuelling the nuclear reactor;

a consequent better relationship with the population, and then a higher certainty of the initial investments.

DISCLOSURE OF THE INVENTION

These and other results are obtained according to this invention by:

a) applying techniques known in mining that allow underground caverns having considerable sizes to be excavated, and assure both the nuclear isle and safeguard buildings and control buildings of a nuclear power plant to be housed into said caverns, by exploiting their absolute capability to prevent radiation and radioactive releases of any kind toward the external environment due to both plant malfunctions or damages caused by terrorist attacks, in virtue of underground rocks having suitable thickness (hundreds of meters);

b) constructing specific facilities for characterising, treating and disposing the radioactive wastes beneath the surface of the ground;

c) adopting suitable procedures for a facilitated decommissioning of the nuclear isle at the end of the service life of the nuclear power plant.

Therefore, a specific object of the present invention is an underground nuclear power system in which the nuclear isle of one or more nuclear power plants are installed in caverns, and further, side by side with them, a centre for characterising, treating and conditioning radioactive wastes and two repositories are installed in suitable caverns, with a final repository being adapted to store low-intermediate level nuclear wastes and a temporary repository being adapted to store spent fuel, high-level long-life radioactive materials and, in case, spare nuclear rods for reactor refueling.

Preferably, according to the invention, a facilitated decommissioning occurs at the end of the service life of the nuclear power plant by sealing radioactive components of the nuclear isle (after closing mechanical openings, disconnecting commands/control systems and after removing nuclear fuel, liquid of primary circuit, and, if necessary, those plant parts that are contaminated by high activity radionuclides), by filling up voids of the cavern hosting the reactor and steam generators with concrete, also of a lightened type, and by closing the entrance of the cavern with metallic doors of adequate thickness and any interposition of walls made of injected concrete between said doors.

Further, according to the invention, an entrance to underground facilities works is made absolutely secure from both terrestrial terrorist attacks and other attacks performed by rockets, aircraft and similar weapons.

Furthermore, according to the invention, the entrance is made so that the underground facilities works cannot be flooded by extreme natural events.

Yet, according to the invention, the radiation containment systems and the safeguard buildings protection are realised by the rocks of the caverns appositely modelled during the excavation in order to host said components.

Moreover, according to the invention, any kind of radioactive wastes of low-intermediate level produced during the service life of the nuclear power plant is stored in a final way inside the underground plant in safe conditions, reducing/avoiding the transport of such wastes outside.

Moreover, all high level nuclear material is temporarily stored in the same site, and if the site is proved as suitable, it will become a final repository also for the high level nuclear material.

Further according to the invention, nuclear fuel supplies can be constituted, thereby reducing the total number of transports for the nuclear power reactor refuelling.

Moreover, according to the invention, the occupation of an external area is extremely limited.

Yet, according to the invention, masses of natural water can be used for cooling.

Further, according to the invention, an access to the nuclear power plant is preferably of sub-horizontal type.

Further, according to the invention, a system for characterising, conditioning and disposing radioactive wastes is provided.

Always according to the invention, commercial, high power PWR reactors can be hosted in said nuclear power plant.

Yet, according to the invention, the underground caverns housing the nuclear isle and the underground caverns storing the radioactive wastes and materials have a roof, an inverted arch and side-walls made impermeable, and will be provided with systems for collecting natural or accidentally released fluids.

Finally, according to the invention, if the underground nuclear plant is realised under a pre-existing conventional nuclear power-station (of superficial type) to be dismantled, the pre-existing conventional nuclear power-station can be decommissioned by transferring the radioactive wastes so produced into underground repositories of the new underground power plant, thereby avoiding any danger of nuclear pollution to the surrounding environment.

BRIEF DESCRIPTION OF THE DRAWINGS

The present invention will be now described by an illustrative and not limiting way, with particular reference to preferred embodiments depicted in the figures of the enclosed drawings, in which.

DESCRIPTION OF AN EMBODIMENT OF THE INVENTION

Figure 1:
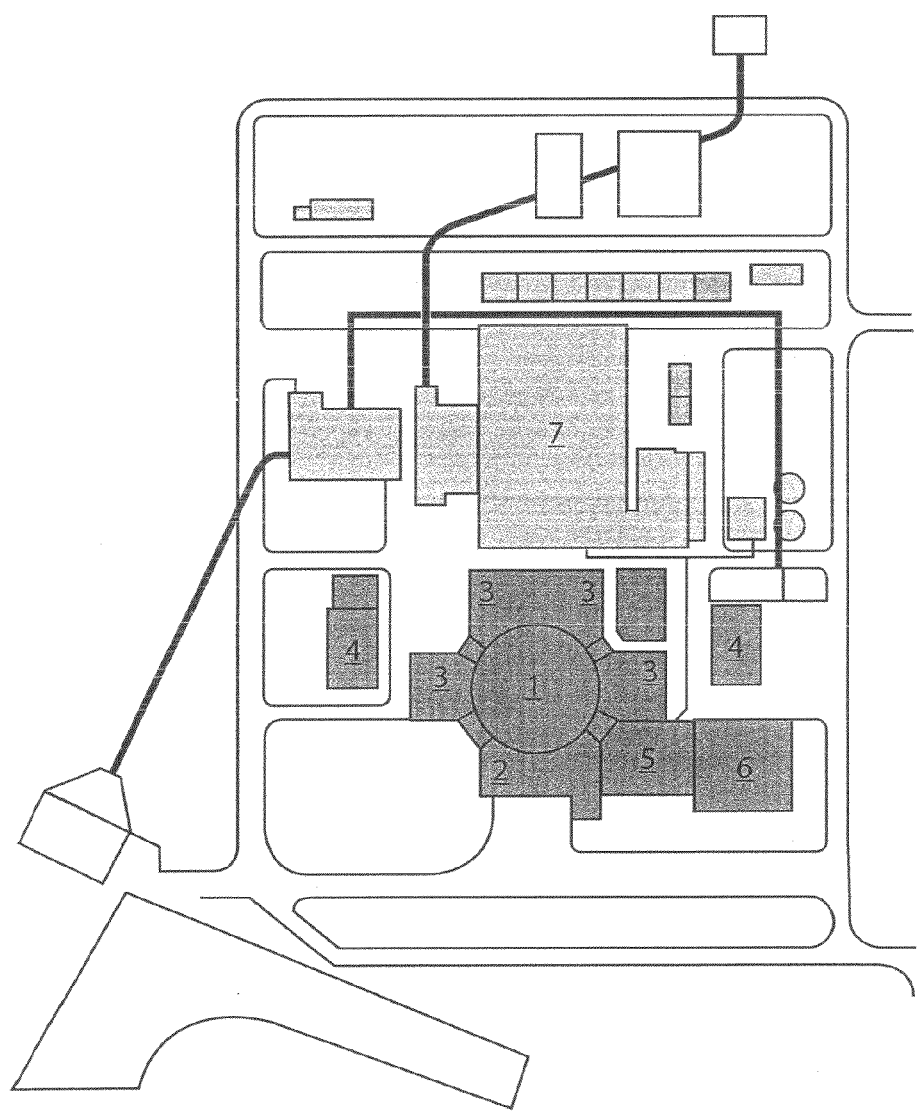
FIG. 1 shows a diagram of a conventional modern EPR nuclear plant.

In FIG. 1 of the enclosed drawings, a layout of a modern EPR nuclear power plant according to the known technique is shown, which comprises a reactor building 1, a fuel building 2, safeguard buildings 3, diesel emergency generator buildings 4, an auxiliary nuclear building 5, a nuclear waste building 6, and a turbine building 7.

Figure 2:
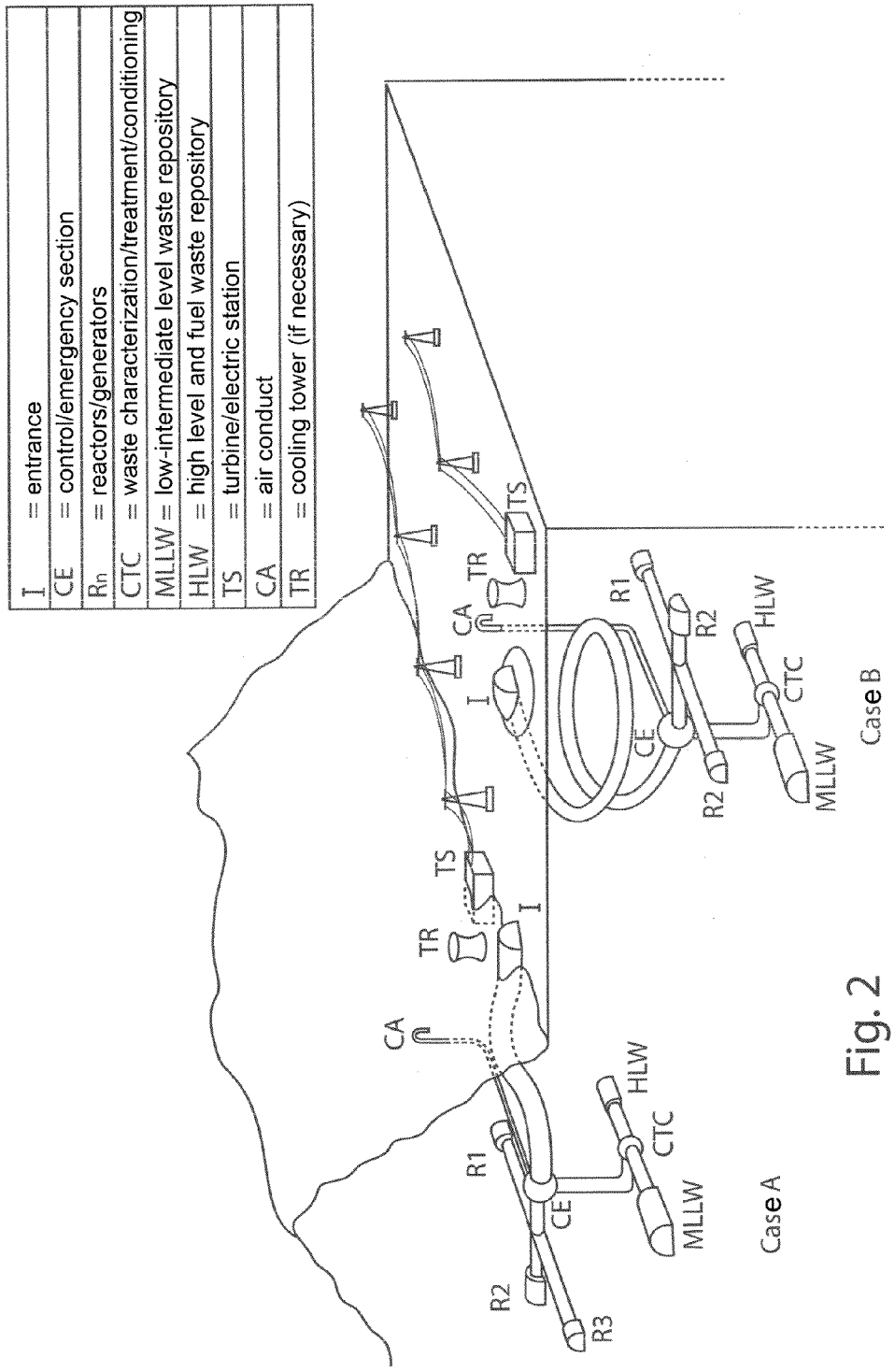
FIG. 2 diagrammatically shows an embodiment of a nuclear power plant according to the invention.

Turning now to FIG. 2, in a plant according to the invention, all the radioactive components, the relevant safeguard buildings and the emergency generators are provided inside underground caverns excavated for this purpose, having adequate dimensions and depth, and being connected to the surface by means of equipped access inclines and/or vertical shafts. Thus all the nuclear components can be confined with respect to the external world.

In this manner, the following components of a PWR nuclear power-plant are situated inside the underground caverns:
reactor/steam generator/pressurizer unit;
safeguard buildings;
control room;
emergency generators.

Substantially a very reduced volume of buildings remains outside.

Further, with the same principle, at marginal costs, it is possible to construct caverns usable, depending on the necessities and the situation of a Country,
as a final repository of radioactive wastes of low-intermediate level,
as a temporary repository of spent fuel and for storing any spare nuclear fuel;
as a final repository of high level (and/or long life) radioactive wastes.

Every underground room will be isolated and equipped with suitable control systems for maintaining pressure differential needed by the activities to be performed therein. Air extracted for maintaining said pressure differential will be treated by suitable filtering systems.

An optimal diagram is that one shown on the left part in FIG. 2, with the entrance being made in a hill slope so that steam generator and turbines can be located at the same level.

In any case, similar results can be obtained (see right part of FIG. 2), with the reactor being placed at a lower level with respect to the entrance; in this case mayor adjustments should be made to a secondary circuit, in particular if the turbines were located at a higher level than the steam generator.

This solution could be adopted for all those cases in which a site hosting an old nuclear power plant to be decommissioned should be re-used for a new nuclear power plant. In this case, the above solution would allow the external area "to be cleaned up" from the radioactive materials by simply moving beneath the surface of the ground, into repository caverns, the radioactive wastes that are produced by decommissioning the old external nuclear power plant.

A comparative analysis, which is made from a new French-German nuclear power plant (1,600 equivalent MW EPR), shows that moving beneath the surface of the ground the nuclear isle of a conventional nuclear power plant according to the solution proposed by the invention, does not imply additional costs with respect to a conventional nuclear plant fully constructed superficially. In fact, the excavation cost (cavern and access tunnels), including material and personnel handling systems is about 150 million of Euro. The figure is very close to, if not even lower than, the overall amount requested, in the case of the new EPR, for:
a reactor basement necessary to contain materials melted by a hypothetical fusion of a reactor core;
two (inner and outer) shelters for containing the radiation, both being 1.3 m thick;
part of the external safeguard buildings, and in particular of the necessary civil works, as in the EPR configuration, four safeguard buildings are located around the reactor in a star-shaped configuration so to reduce the risk to be altogether destroyed by a mono-directional aerial incursion.

Tasks today assigned to these components in a classic EPR would be very well accomplished super-safely by the rock cover above the underground caverns where the excavations designed to host the radioactive parts of the nuclear power plant and the safeguard buildings according to the present invention should be conducted.

As far as the facilitated decommissioning of the nuclear isle, it will be obtained:

i.1) by constructing the roof, the inverted arch base and the side-walls of the cavern for reactor and steam generator in such a way to make them impermeable and installing an appropriate system for collecting fluids (which can be both natural or coming from possible accidental releases);

i.2) by applying (after removing, at the end of the service life of the nuclear power plant, the spent fuel, the circulation liquid of the primary circuit and, if necessary, the parts contaminated with high-activity long-life radionuclides, and after sealing the mechanical openings and disconnecting the command and operating control systems) a spritz beton lining (or a universal primer for metal/mortars of cement) on the components to be sealed;

i.3) by installing, in the relevant points of the cavern and the components of reactor and steam generator, sensors for monitoring temperature, humidity, and radioactivity;

i.4) by filling up voids of the cavern for reactor and steam generator with concrete injection (possibly of expanded/lightened type);

i.5) by hermetically closing the entrance to the cavern for reactor and steam generator;

i.6) by continuously monitoring the system by the sensors in i.4).

The safety against external attacks and natural catastrophic events will be obtained, as already said, by moving to a place beneath the surface of the ground the nuclear isle, the security systems and the emergency generators and, moreover, by:

ii.1) anti-intrusion devices located at the entrance of the underground nuclear power plant;

ii.2) anti-flooding devices;

ii.3) moving to a place beneath the surface of the ground, where possible, also partially, the building hosting the turbines/electrical generators;

ii.4) using, where possible, natural water masses (sea, river . . . ) for the cooling, instead of air towers;

ii.5) devices for maintaining rooms and caverns depressurised and for treating/filtering the air so extracted.

The characterisation-localisation-licensing studies will be developed with the following progression:

iii.1) initial localisation, according to the existing rules, of a site for hosting a nuclear power plant, a final low-intermediate level radioactive waste repository (300 years lasting) and a temporary repository (50 years lasting) for spent fuel, high level wastes and any spare rods for reactor refueling;

iii.2) studies and tests, to be carried out during a part of the 50-60 years of service life of the nuclear power plant, in order to verify the suitability of the temporary underground cavern to house, in a final manner, high-level long-life nuclear wastes (for 50,000 years).

A nuclear power plant so designed can use, with relatively simple modifications feasible in short time, the reactors already licensed and now existing in the market, of both small and high power.

Differing from other similar proposals, the caverns will have, as much as possible, sub-horizontal access (in hill slopes) in order to avoid any loss of charge in the circuits and, if realised under the terrain surface in plain areas, will have systems for connecting the underground facilities to the surface through inclines and/or service shaft.

As far as the economic-financial model of the investment necessary for constructing a plant of the kind here proposed, the solution according to the invention offers the opportunity of taking into account from the beginning the times and costs for the decommissioning. Moreover, these costs can be assumed as substantially negligible (5-10% less than the costs of a conventional decommissioning) and the decommissioning will be performed certainly.

For a conventional, superficially nuclear power plant, its decommissioning strongly depends on the availability of a radioactive waste repository, on the necessity of completely dismantling the nuclear power plant and returning the hosting area to green field condition, on the distance between the nuclear power plant and the radioactive waste repository, and, above all, on the uncertainty of the times required for obtaining the relevant construction authorisation. All these factors make a correct a priori evaluation of the costs highly improbable.

Other relevant savings are offered by the possibility of using at marginal costs, during the construction of the nuclear power plant and the management of the nuclear waste and/or radioactive material repositories, the same handling systems to connect the cavern with outside, that are already arranged for the nuclear isle.

Therefore, the solution here proposed according to the invention permits the realisation of a supersafe and easily-/certainly decommissionable nuclear power plant, so that the recourse of the nuclear energy is made again acceptable by populations, from the proposal of installing nuclear reactors beneath the surface of the ground, as already proposed in the years 60-70.

The plant according to the invention provides the installation of the nuclear isle of one or more nuclear reactors in caverns, and further the installation, side by side with them, of a centre for characterising, treating and conditioning radioactive wastes and two repositories in suitable caverns (of which a final one is for low-intermediate level nuclear wastes and a temporary one is for the spent fuel and high-level long-life radioactive materials).

In particular, this allows an extremely simplified decommissioning immediately at the end of the service life of the nuclear power plant and the realisation of inviolable accesses to the underground facilities.

In this manner:

(i) the costs of decommissioning of the nuclear power plants (usually between 30 and 60% of the cost of construction) are drastically reduced;

(ii) both the decommissioning at the end of the service life of the nuclear power plant and the final disposal of the low-intermediate level wastes become certain;

(iii) the number of fuel transports for refueling the reactor is reduced;

(iv) the handling of the radioactive wastes on the soil surface towards the characterisation-treatment-conditioning-disposal centres is avoided and, above all, the incomparable capacity of natural protection offered by the rocks and the possibility of making inviolable accesses to the underground works can be exploited;

(v) nuclear releases towards the external environment, due to both malfunctions of the plants or leakage caused by (aerial or terrestrial) terrorist attacks or catastrophic natural events, are completely avoided;

(vi) additional costs are avoided, the costs for excavations and works for transferring underground the nuclear isle being compensated by the saving obtained since external protection works should not be constructed (shelters, sacrificial basements, redundancies necessary for the physical protection and for the plural safeguards buildings, minor soil occupation . . . ), (vii) there are other savings because the characterisation-treatment-conditioning centre and the two radioactive material repositories can be constructed at marginal costs, since they could use the handling systems with outside and the systems for physical protection already implemented for the nuclear power plant in cavern, (viii) the nuclear power plant can be constructed with extreme simplicity because it is possible to take advantage from the high level of technology reached in mining, so that the components of the main allowable nuclear power plants (from the French-German EPR to the Westinghouse and Russian WER power plant) can find (with marginal modifications) an easy arrangement in caverns of adequate dimensions; modifications that, consequently, can be put into effect in very short times especially if compared to those required from other plans of new generation nuclear reactors that are developed at the moment, (ix) it is possible, during the service life of a nuclear power plant according to the present patent application (that would demand a surveying similar to that necessary for localisation of a final low-intermediate radioactive waste repository in order to be authorised), to have all the time to carry out procedures able to verify any suitability of the site to host finally, and not only, also high-level long-life radioactive wastes. However, such radioactive wastes would be hosted for 50-60 years in the best manners and in safety conditions, that are obviously higher than those offered by a conventional nuclear power plant, which is constructed on the surface.

The present invention has been described in an illustrative and not limiting way, according to its preferred embodiments. It should be understood that variations and/or modifications could be made by skilled in the art without departing from the scope of the invention as defined in the enclosed claims.

The invention claimed is:

1. A nuclear power plant, comprising:
   a nuclear island, including one or more nuclear reactors located in one or more underground caverns;
   side by side with the one or more nuclear reactors, a centre for treating and conditioning radioactive wastes; and
   two repositories, located in the one or more underground caverns, the two repositories including a final repository being adapted to store low-intermediate level nuclear wastes, and a temporary repository being adapted to store spent fuel, high-level long-life radioactive materials, and spare nuclear rods for reactor refueling.

2. The underground nuclear power plant according to claim 1, further comprising:
   metallic doors for closing an entrance to the one or more underground caverns, and an interposition of walls made of injected concrete between said metallic doors.

3. The underground nuclear power plant according to claim 1, wherein the one or more underground caverns comprise an entrance provided with anti-intrusion devices to secure the nuclear island from attack from outside the one or more underground caverns.

4. The underground nuclear power plant according to claim 1, wherein the one or more underground caverns comprise an entrance provided with anti-flooding devices.

5. The underground nuclear power plant according to claim 1, wherein the one or more underground caverns is formed of rocks appositely formed to host the nuclear island, the centre for treating and conditioning radioactive wastes, and the two repositories.

6. The underground nuclear power plant according to claim 1, further comprising:
   storage facilities for radioactive wastes of low-intermediate level produced during a service life of the nuclear power plant for final underground storage in safe conditions to avoid transport of the radioactive wastes of low-intermediate level outside.

7. The underground nuclear power plant according to claim 1, wherein the temporary repository is adapted to operate as a final repository for all high-level long-life radioactive materials produced by the underground nuclear power plant.

8. The underground nuclear power plant according to claim 1, wherein substantially all components of the one or more nuclear reactors are underground.

9. The underground nuclear power plant according to claim 1, wherein the one or more nuclear reactors is constructed and arranged to use masses of natural water for cooling.

10. The underground nuclear power plant according to claim 1, wherein an access to an interior of the one or more underground caverns is horizontal.

11. The underground nuclear power plant according to claim 1, further comprising:
    a system for conditioning and disposing radioactive wastes provided inside the one or more underground caverns.

12. The underground nuclear power plant according to claim 1, wherein the one or more nuclear reactors is one or more commercial, high power PWR reactors.

13. The underground nuclear power plant according to claim 1, wherein the one or more underground caverns housing the nuclear isle and the the two repositories have a roof formed of an inverted arch and side-walls made substantially impermeable and provided with systems for collecting natural or accidentally released fluids.

14. The underground nuclear power plant according to claim 1, wherein the underground nuclear power plant is constructed and arranged to receive the radioactive wastes of the two repositories, thereby avoiding any danger of nuclear pollution to the surrounding environment.

* * * * *